United States Patent [19]
Mazur et al.

[11] Patent Number: 5,484,166
[45] Date of Patent: Jan. 16, 1996

[54] METHOD AND APPARATUS FOR PROVIDING A DEPLOYMENT SIGNAL FOR A VEHICLE OCCUPANT RESTRAINT DEVICE DURING A SIDE IMPACT CRASH

[75] Inventors: Joseph F. Mazur, Washington; Brian K. Blackburn, Rochester; Scott B. Gentry, Romeo, all of Mich.

[73] Assignee: TRW Vehicle Safety Systems Inc., Lyndhurst, Ohio

[21] Appl. No.: 279,594

[22] Filed: Jul. 22, 1994

[51] Int. Cl.⁶ ................................................. B60R 21/32
[52] U.S. Cl. ..................... 280/735; 280/730.2; 307/10.1; 340/436
[58] Field of Search ............................. 280/735; 180/274, 180/284, 282; 307/10.1; 340/438, 436

[56] References Cited

U.S. PATENT DOCUMENTS

| | | |
|---|---|---|
| 3,687,213 | 8/1972 | Sato et al. . |
| 3,720,426 | 3/1973 | Johnston . |
| 4,836,024 | 6/1989 | Woehrl et al. . |
| 5,036,467 | 7/1991 | Blackburn et al. . |
| 5,072,966 | 12/1991 | Nishitake et al. . |
| 5,109,341 | 4/1992 | Blackburn et al. . |
| 5,129,673 | 7/1992 | Mattes et al. . |
| 5,145,208 | 9/1992 | Hoagland et al. . |
| 5,157,268 | 10/1992 | Spies et al. . |
| 5,172,790 | 12/1992 | Ishikawa et al. . |
| 5,173,614 | 12/1992 | Woehrl et al. . |
| 5,202,831 | 4/1993 | Blackburn et al. ..................... 280/735 |
| 5,216,607 | 6/1993 | Diller et al. . |
| 5,225,985 | 7/1993 | Okano ..................................... 280/735 |
| 5,338,062 | 8/1994 | Kiuchi ..................................... 280/735 |

FOREIGN PATENT DOCUMENTS

| | | | |
|---|---|---|---|
| 531989 | 3/1993 | European Pat. Off. ............... | 280/735 |

*Primary Examiner*—Karin L. Tyson
*Attorney, Agent, or Firm*—Tarolli, Sundheim & Covell

[57] ABSTRACT

A method and apparatus (10) provide a deployment signal for deploying a vehicle occupant restraint device (20) during a side impact to a vehicle. The method includes the step of sensing a non-door side impact at a non-door location, and the step of providing a non-door side impact signal. The method further includes the step of sensing an on-door side impact at a vehicle door, and the step of providing an on-door side impact signal. The non-door side impact signal is evaluated to determine if it indicates a non-door deployment crash condition. The on-door side impact signal is evaluated to determine if it indicates an on-door deployment crash condition. A deployment signal is provided for deploying the vehicle occupant restraint device (20) when either of the side impact signals indicates a deployment crash condition.

16 Claims, 5 Drawing Sheets

5,484,166

METHOD AND APPARATUS FOR PROVIDING A DEPLOYMENT SIGNAL FOR A VEHICLE OCCUPANT RESTRAINT DEVICE DURING A SIDE IMPACT CRASH

TECHNICAL FIELD

The present invention is directed to a vehicle occupant restraint device, and is particularly directed to a method and apparatus for providing a deployment signal for deploying a vehicle occupant restraint device during a side impact crash condition.

BACKGROUND OF THE INVENTION

Vehicle occupant restraint systems that detect vehicle crash conditions and that actuate vehicle occupant restraining devices are known in the art. Such a vehicle occupant restraint system includes a vehicle crash sensor, such as an inertia switch or an accelerometer, and one or more vehicle occupant restraining devices, such as air bags. The air bags may include a first air bag located forward of the occupant, e.g., in the instrument panel or steering wheel, and a second air bag located in a side door. A vehicle occupant restraint system that includes such front and side mounted air bags also includes a control scheme to control deployment of the air bags in response to a detected crash condition.

U.S. Pat. No. 3,720,426 to Johnson discloses a system for controlling actuation of a plurality of vehicle safety devices including front, rear and side air bags. The '426 system includes a crash sensor/actuation device. The crash sensor/actuation device includes an inverted hollow conical housing containing a free metal ball and a plurality of arcuate electrical contact pairs. Each electrical contact pair is controllably connected to an associated air bag. During vehicle deceleration, the metal ball rolls up the sloped sidewall of the conical housing. Upon the occurrence of a predetermined deceleration of the vehicle, i.e., in a crash condition, the metal ball rolls up the sloped sidewall and makes contact with one of the pairs of electrical contacts, thereby closing an associated electric circuit. The pair of electrical contacts that is contacted by the metal ball is dependent upon the direction of the vehicle crash. The contact of the metal ball with the pair of electrical contacts results in deployment of the associated air bag.

U.S. Pat. No. 5,172,790 to Ishikawa, et al. discloses a vehicle crash discrimination system for controlling actuation of a side mounted air bag during a crash in which an impact is directed against a door at the side of the vehicle. The '790 system includes a plurality of sensors. A control unit monitors the sensors and, upon the occurrence of a crash condition, controls which air bag is to be deployed in response to the outputs of the sensors. The sensors include a deceleration sensor which is mounted on the driver's door. Another deceleration sensor is mounted on the passenger's door. A weight sensor for sensing the "seated" state of a passenger is mounted in the driver's seat, and another such weight sensor is mounted in the passenger's seat. The sensors further include a belt lock sensor for the driver's seat and another belt lock sensor for the front passenger's seat. Each of the belt lock sensors senses whether an occupant of the respective seat is wearing the associated seat belt. The control unit monitors the sensors to control deployment of the air bags in response to outputs of the sensors. When a deceleration signal from one of the door mounted sensors indicates the occurrence a side crash into the associated door, the control unit actuates one or both of the side mounted air bags. Actuation of the air bags is further dependant upon the status of the weight sensors and belt lock sensors.

SUMMARY OF THE INVENTION

In accordance with the present invention, a method and apparatus provide a deployment signal for deploying a vehicle occupant restraint device, such as an air bag, in response to a side impact to a vehicle.

The method comprises the step of sensing a non-door side impact to the vehicle at a non-door location, and the step of providing a non-door side impact signal. The method also includes the steps of sensing an on-door side impact to the vehicle at a vehicle door, and providing an on-door side impact signal.

In further steps, the non-door side impact signal is evaluated to determine if it indicates the occurrence of a non-door deployment crash condition, i.e., a non-door crash condition requiring deployment of the vehicle occupant restraint device. The on-door side impact signal is evaluated to determine if it indicates an on-door deployment crash condition. A deployment signal for deploying the vehicle occupant restraint device is provided when either of the side impact signals indicates a deployment crash condition.

Preferably, the step of evaluating the non-door side impact signal to determine if it indicates a deployment crash condition is prevented when the on-door side impact signal exceeds an on-door threshold value. Most preferably, the step of evaluating the non-door side impact signal determines if a velocity value of the non-door signal exceeds a predetermined non-door velocity threshold value which indicates a non-door deployment crash condition. That step of evaluating the non-door side impact signal is prevented when an acceleration value of the on-door side impact signal exceeds a predetermined on-door acceleration threshold value.

Further in accordance with the present invention, the apparatus includes a means for sensing a non-door side impact at a non-door location, and for providing a non-door side impact signal. The apparatus also includes a means for sensing an on-door side impact at a vehicle door, and for providing an on-door side impact signal. A means for evaluating the non-door side impact signal determines if the non-door side impact signal indicates a non-door deployment crash condition. A means for evaluating the on-door side impact signal determines if the on-door side impact signal indicates an on-door deployment crash condition. The apparatus further includes a means for providing a deployment signal for deploying the vehicle occupant restraint device when either of the side impact signals indicates a deployment crash condition.

Preferably, the apparatus includes a means for disabling the means for evaluating the non-door side impact signal when a value of the on-door side impact signal exceeds an on-door threshold value. Most preferably, the means for evaluating the non-door side impact signal determines if a velocity value of the non-door signal exceeds a predetermined non-door velocity threshold value which indicates a non-door deployment crash condition. The means for evaluating the non-door side impact signal is disabled when an acceleration value of the on-door side impact signal exceeds a predetermined on-door acceleration threshold value.

BRIEF DESCRIPTION OF THE DRAWINGS

The foregoing and other features of the present invention will become apparent to those skilled in the art to which the present invention relates from reading the following description with reference to the accompanying drawings, in which.

DETAILED DESCRIPTION

Figure 1:
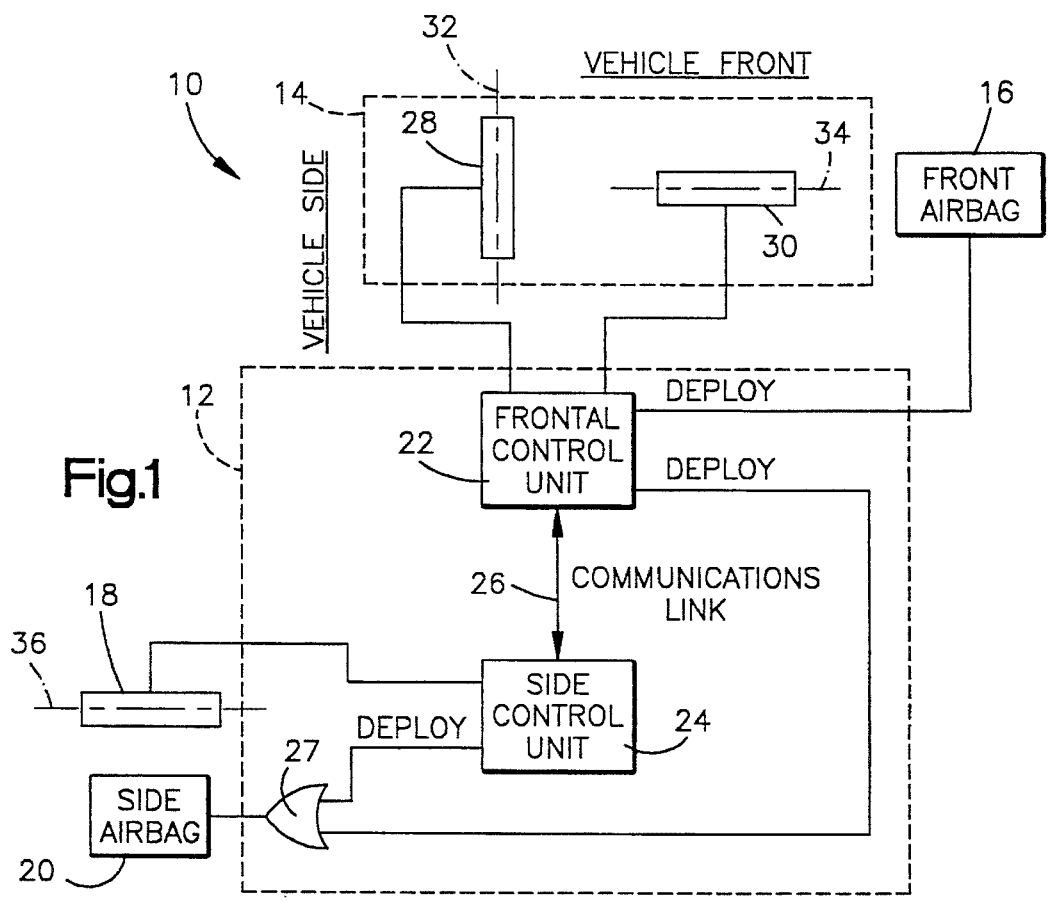
FIG. 1 is a schematic view of a vehicle occupant restraint system comprising a preferred embodiment of the present invention.

A vehicle occupant restraint system 10 comprising a preferred embodiment of the present invention is shown schematically in FIG. 1. The system 10 includes a controller 12 which is operatively connected to a front crash sensor assembly 14 and a front mounted air bag 16. The front mounted air bag 16 is the driver's side air bag, and is mounted on the vehicle steering wheel (not shown) in a known manner. The controller 12 is further connected to a side crash sensor 18 and a side air bag 20, both of which are mounted on the driver's side door of the vehicle. Although the air bags 16 and 20 are mounted at the driver's side of the vehicle, the present invention is equally applicable to air bags mounted at the passenger's side of the vehicle, and the air bags could alternatively be mounted in a roof rail, on a pillar, in or beneath a vehicle seat, or at any other appropriate location in a vehicle.

The controller 12 includes a frontal control unit 22 and a side control unit 24. A communications link 26 provides communication between the frontal control unit 22 and the side control unit 24. The frontal control unit 22 is connected to the front air bag 16, and is connected to the side air bag 20 through an OR gate 27. The frontal control unit 22 is also connected to the front crash sensor assembly 14, which includes two orthogonally oriented front crash sensors 28 and 30. The side control unit 24 is connected to the side air bag 20, and is connected to the side crash sensor 18 through the OR gate 27.

The crash sensors 18, 28, and 30 are preferably all electrical accelerometers. Each of the crash sensors 18, 28, and 30 has an associated axis of sensitivity, and is responsive to accelerations having a component along its associated axis of sensitivity.

The axis of sensitivity of the front crash sensor 28 is indicated in FIG. 1 by the line 32. The front crash sensor 28 is mounted in the vehicle such that its axis of sensitivity 32 is parallel to the longitudinal axis of the vehicle. As a result, the front crash sensor 28 provides the frontal control unit 22 with a signal having a value indicative of longitudinal deceleration of the vehicle which is caused by a crash impact directed longitudinally of the vehicle. The frontal control unit 22 provides a deployment signal for deployment of the front air bag 16 when the signal from the front crash sensor 28 indicates that such longitudinal vehicle deceleration is sufficient to require deployment of the front air bag 16.

The other front crash sensor 30 has its axis of sensitivity 34 perpendicular to the longitudinal axis of the vehicle. The front sensors 28 and 30 are thus mounted in the vehicle such that their respective axes of sensitivity 32 and 34 are perpendicular to each other. The front crash sensor 30 is sensitive to side impacts to the vehicle, and is particularly sensitive to non-door side impacts, i.e., impacts to the side of the vehicle at locations that are not at the vehicle door. Such non-door side impacts are known in the art as L-shot impacts. The front crash sensor 30 thus provides the frontal control unit 22 with a signal indicative of transverse acceleration of the vehicle which is caused by a side impact such as a non-door side impact. The frontal control unit 22 provides a deployment signal for deployment of the side air bag 20 through the OR gate 27 when the signal from the front crash sensor 30 indicates that such transverse vehicle acceleration is sufficient to require deployment of the side air bag 20.

The side control unit 24 is connected to the side crash sensor 18 in the driver's side door. Because the side crash sensor 18 is mounted in a door, it is particularly sensitive to side impacts to the vehicle at the door, i.e., on-door side impacts. Moreover, the side crash sensor 18 is mounted with its axis of sensitivity 36 perpendicular to the longitudinal axis of the vehicle. As a result, the side crash sensor 18 provides a signal having a value indicative of transverse acceleration of the vehicle that is caused by a side impact such as an on-door side impact. The side control unit 24 monitors the signal provided by the side crash sensor 18. When this signal is indicative of a side impact requiring deployment of the side air bag 20, the side control unit 24 provides a deployment signal through the OR gate 27 for deployment of the side air bag 20.

Figure 2:
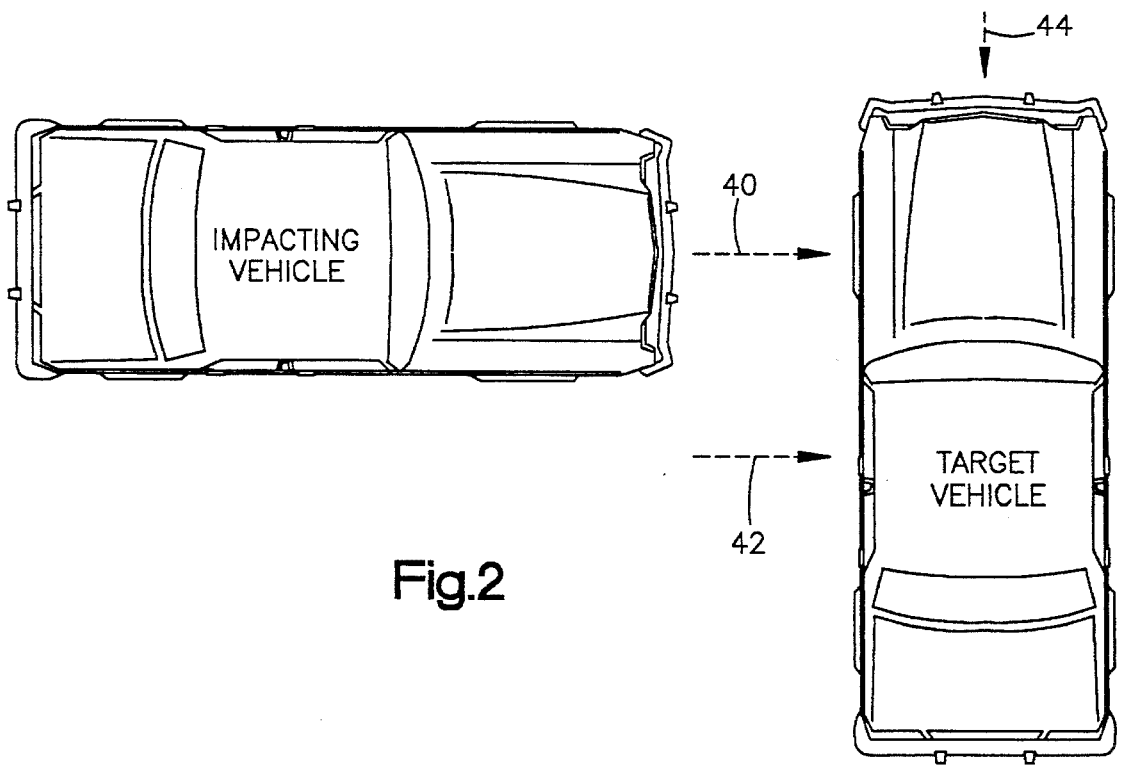
FIG. 2 is a schematic view of two vehicles in an impending crash condition.

FIG. 2 illustrates examples of the various impacts to a vehicle that are detected in accordance with the present invention. As a first example, the line 40 shown in FIG. 2 represents an L-shot impact directed against the driver's side of a target vehicle by an impacting vehicle. The front crash sensor 30 provides a signal indicative of transverse vehicle acceleration caused by such a side impact. The line 42 shown in FIG. 2 represents an on-door side impact at the driver's side door of the target vehicle. The side crash sensor 18 provides a signal indicative of transverse vehicle acceleration caused by such a side impact. Additionally, the line 44 represents a frontal vehicle impact. The front crash sensor 28 provides a signal indicative of longitudinal vehicle deceleration caused by such a frontal impact.

Figure 3A:
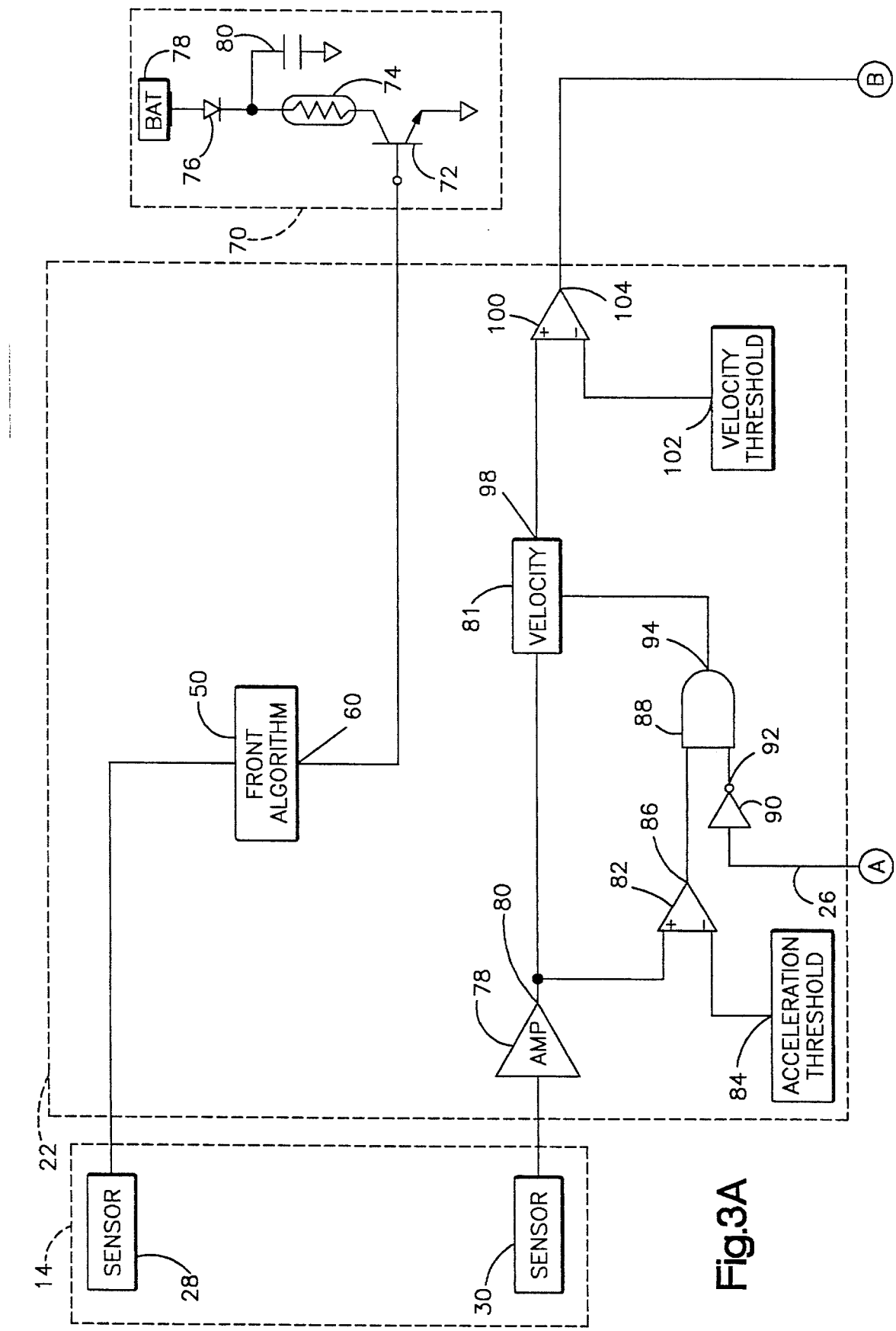
FIGS. 3A and 3B are a schematic block diagrams showing details of the system of FIG. 1.
Figure 3B:
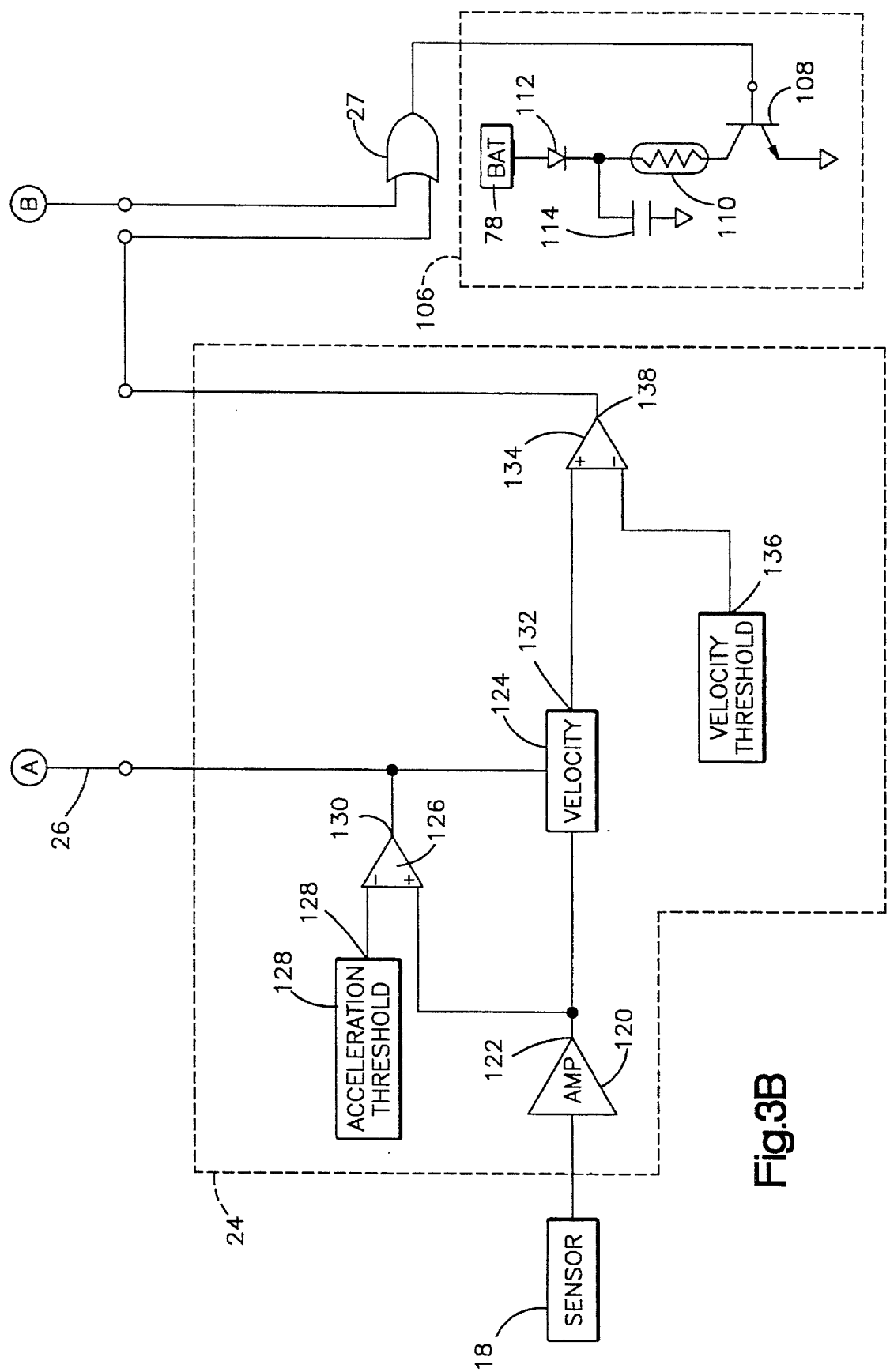

FIGS. 3A and 3B are schematic block diagrams showing details of the controller 12. The frontal control unit 22 in the controller 12 monitors the deceleration signal provided by the front crash sensor 28, and applies a front algorithm 50 to the deceleration signal to evaluate the longitudinal vehicle deceleration indicated by the deceleration signal. If the longitudinal vehicle deceleration is sufficient to indicate the occurrence of a longitudinally directed impact to the vehicle which requires deployment of the front air bag 16, i.e., a longitudinal deployment crash condition, the front algorithm 50 results in a deployment output signal 60 having a digital HIGH value. If the longitudinal deceleration is not sufficient to indicate the occurrence of a deployment crash condition, the front algorithm 50 results in a deployment output signal 60 having a digital LOW value. The front algorithm 50 may comprise any suitable algorithm known in the art.

The frontal control unit 22 provides the deployment output signal 60 to a first actuator assembly 70 which is operatively associated with the front air bag 16. The first actuator assembly 70 includes a transistor 72, a squib 74, and a diode 76. The emitter of the transistor 72 is connected to ground, and the collector is connected to one terminal of the squib 74. The other terminal of the squib 74 is connected to the cathode of the diode 76. The anode of the diode 76 is connected to the vehicle battery 78. The deployment output signal 60 is provided to the base of the transistor 72.

As described above, when a longitudinal deployment crash condition is detected, the deployment output signal 60 is a digital HIGH. The digital HIGH value of the deployment output signal 60 turns the transistor 72 ON, and thus causes current to flow from the battery 78 through the diode 76 and the squib 74. A capacitor 80, which is connected between the cathode of the diode 76 and ground, serves to provide the squib 74 with sufficient current should the battery 78 become disconnected from the diode 76 during a vehicle crash. The flow of current through the squib 74 causes the squib 74 to generate combustion products in a known manner. The combustion products generated by the squib 74 actuate a source of inflation fluid (not shown), which may comprise an ignitable gas generating material and/or a contained volume of pressurized inflation fluid. The source of inflation fluid then provides inflation fluid which is directed into the front air bag 16 to inflate the front air bag 16.

The frontal control unit 22 also monitors the acceleration signal provided by the other front crash sensor 30. The other front crash sensor 30, as described above, senses a side impact to the vehicle, such as the L-shot impact indicated by the line 40 shown in FIG. 2, and provides an acceleration signal indicative of transverse vehicle acceleration caused by such an impact. In the frontal control unit 22, an amplifier 78 amplifies the acceleration signal provided by the front crash sensor 30, and provides an amplified acceleration output signal 80.

The amplified acceleration output signal 80 is provided to a velocity determining circuit 81. The amplified acceleration output signal 80 is also provided as an input to a comparator 82. An acceleration threshold output signal 84 is provided as the other input to the comparator 82. The acceleration threshold output signal 84 has a value which is predetermined empirically for the particular vehicle platform. The comparator 82 compares the value of the amplified acceleration output signal 80 against the value of the acceleration threshold output signal 84, and provides a comparator output signal 86 indicative of the comparison of the two output signals 80 and 84. When the value of the amplified acceleration output signal 80 is greater than the value of the acceleration threshold output signal 84, the comparator output signal 86 is a digital HIGH. Conversely, the comparator output signal 86 is a digital LOW when the value of the amplified acceleration output signal 80 is less than the value of the acceleration threshold output signal 84.

The comparator output signal 86 is one input to an AND gate 88. An inverter 90 provides an output signal 92 which is the other input of the AND gate 88. The inverter output signal 92 originates in the side control unit 24 in a manner described fully below, and normally is a digital HIGH. The AND gate 88 provides an output signal 94 to the velocity determining circuit 81. The output signal 94 from the AND gate 88 is a digital HIGH only when both the comparator output signal 86 and the inverter output signal 92 are digital HIGHS. When the output signal 94 from the AND gate 88 is a digital HIGH, the velocity determining circuit 81 integrates the amplified acceleration output signal 80 over time, and provides a crash velocity output signal 98. The crash velocity output signal 98 indicates transverse vehicle velocity caused by the side impact that resulted in the amplified acceleration output signal 80. When the output signal 94 from the AND gate 88 is a digital LOW, the velocity determining circuit 81 does not integrate the amplified acceleration output signal 80, and does not provide the crash velocity output signal 98. In this way, the velocity determining circuit 81 does not integrate acceleration signals indicating small transverse vehicle accelerations that are not caused by a vehicle crash, such as those caused by a turning maneuver.

The crash velocity output signal 98 is provided as one input to a comparator 100. The other input to the comparator 100 is a velocity threshold output signal 102 having a value which is determined empirically for the particular vehicle platform. The comparator 100 compares the value of the crash velocity output signal 98 against the value of the velocity threshold output signal 102, and provides a comparator output signal 104 indicative of the comparison of the two output signals 98 and 102. When the crash velocity output signal 98 has a value greater than the value of the velocity threshold output signal 102, the comparator output signal 104 is a digital HIGH. The comparator output signal 104 is then a deployment signal which indicates a deployment crash condition for the side air bag 20. When the crash velocity output signal 98 has a value less than the value of the velocity threshold output signal 98, the comparator output signal 104 is a digital LOW. The comparator output signal 104 then indicates a non-deployment crash condition for the side air bag 20.

As shown in FIG. 3B, the frontal control unit 22 provides the comparator output signal 104 to the OR gate 27. The output of the OR gate 27 is provided to a second actuator assembly 106 which is operatively associated with the side air bag 20. Like the first actuator assembly 70 described above, the second actuator assembly 106 includes a transistor 108, a squib 110, and a diode 112 connected to the vehicle battery 78. A capacitor 114 in the second actuator assembly 106 serves to provide the squib 110 with sufficient current should the vehicle battery 78 become disconnected from the diode 112 during a vehicle crash.

The emitter of the transistor 108 is connected to ground, and the collector is connected to one terminal of the squib 110. The other terminal of the squib 110 is connected to the cathode of the diode 112. The anode of the diode 112 is connected to the vehicle battery 78. The output of the OR gate 27 is provided to the base of the transistor 108.

When the comparator output signal 104 is a deployment signal with a digital HIGH value indicating a non-door deployment crash condition for the side air bag 20, the output of the OR gate 27 also has a digital HIGH value. A HIGH output from the OR gate 27 turns the transistor 108 ON. The transistor 108 then causes current to flow from the vehicle battery 78 through the diode 112 and the squib 110. The flow of current through the squib 110 causes the squib 110 to generate combustion products in a known manner. The combustion products generated by the squib 110 actuate an associated source (not shown) of inflation fluid in a known manner. The side air bag 20 is then inflated.

As further shown in FIG. 3B, the side control unit 24 monitors the acceleration signal provided by the side crash sensor 18. As described above, the side crash sensor 18 senses a side impact to the vehicle, such as the on-door side impact indicated by the line 42 shown in FIG. 2, and provides an acceleration signal indicative of transverse vehicle acceleration caused by such an impact. An amplifier 120 amplifies the acceleration signal provided by the side crash sensor 18, and provides an amplified acceleration output signal 122. The amplified acceleration output signal 122 is provided to a velocity determining circuit 124.

The amplified acceleration output signal 122 is also provided as one input to a comparator 126. The other input to the comparator 126 is an acceleration threshold output signal 128 having a value which is predetermined empirically for the particular vehicle platform. The comparator 126 compares the value of the amplified acceleration output signal 122 against the value of the acceleration threshold output signal 128, and provides a comparator output signal 130 indicative of the comparison of the two output signals 122 and 128. When the value of the amplified acceleration output signal 122 is greater than the value of the acceleration threshold output signal 128, the comparator output signal 130 is a digital HIGH. When the value of the amplified acceleration output signal 122 is less than the value of the acceleration threshold output signal 128, the comparator output signal 130 is a digital LOW.

The comparator output signal 130 is provided to the velocity determining circuit 124, and functions to enable or disable integration by the velocity determining circuit 124 in the same manner as described above with reference to the output signal 94 from the AND gate 88, and the velocity determining circuit 81, in the frontal control unit 22. If the velocity determining circuit 124 is enabled by the comparator output signal 130, it integrates the amplified acceleration output signal 122, and provides a crash velocity output signal 132. The crash velocity output signal 132 indicates transverse vehicle velocity caused by the side impact that resulted in the amplified acceleration output signal 122.

The crash velocity output signal 132 is one input to a comparator 134. The other input to the comparator 134 is a velocity threshold output signal 136 having a value which is determined empirically for the particular vehicle platform. The comparator 134 compares the values of the crash velocity output signal 132 and the velocity threshold output signal 136, and provides a comparator output signal 138 which has a value indicative of the comparison of the two output signals 132 and 136. When the crash velocity output signal 132 has a value greater than the value of the velocity threshold output signal 136, the comparator output signal 138 is a deployment signal with a digital HIGH value indicating a deployment crash condition for the side air bag 20. When the crash velocity output signal 132 has a value less than the value of the velocity threshold output signal 136, the comparator output signal 138 is a digital LOW indicating a non-deployment crash condition for the side air bag 20.

The comparator output signal 138 generated by the side control unit 24 is provided to the OR gate 27. If the comparator output signal 138 is a deployment signal with a digital HIGH value indicating a deployment crash condition for the side air bag 20, the output of the OR gate 27 also has a digital HIGH value. The output of the OR gate 27 then turns the transistor 108 ON. This causes current to flow through the squib 110, and the associated source of inflation fluid is actuated to effect inflation of the side air bag 20.

A particular feature of the present invention is directed to the fact that an on-door side impact of sufficient intensity at the driver's side door will cause both the side crash sensor 18 and the front crash sensor 30 to detect transverse vehicle acceleration that is caused by such a side impact, because both the side crash sensor 18 and the front crash sensor 30 are sensitive to transverse vehicle acceleration. However, the empirically predetermined threshold values associated with the front crash sensor 30 are preferably lower than those associated with the side crash sensor 18. Therefore, it is possible for the front crash sensor 30 to misinterpret transverse vehicle acceleration caused by an on-door side impact as indicating a deployment crash condition which requires deployment of the side air bag 20 when, in fact, the transverse vehicle acceleration is not sufficient to establish a deployment crash condition. Therefore, during an on-door side impact at the driver's side door, only the side control unit 24, rather than both the front and side control units 22 and 24, evaluates the respective acceleration signal beyond a comparison against its respective predetermined acceleration threshold value. The present invention thus prevents an inadvertent deployment of the side air bag 20 in response to the acceleration signal provided by the front crash sensor 30 during an on-door side impact to the vehicle. Such exclusive operation of the side control unit 24 is effected by the controller 12 in the following manner.

The comparator output signal 130 generated in the side control unit 24 is further provided to the frontal control unit 22 by the communications link 26. Specifically, the comparator output signal 130 is provided as the input to the inverter 90 in the frontal control unit 22. When the comparator output signal 130 is a digital HIGH, the inverter output signal 92 provided to the AND gate 88 by the inverter 90 is a digital LOW. The output signal 94 provided to the velocity determining circuit 81 by the AND gate 88 likewise is a digital LOW. As a result, the output signal 94 prevents the velocity determining circuit 81 from integrating the amplified acceleration output signal 80 whenever the value of the comparator output signal 130 on the communications link 26 is a digital HIGH. As described above, the value of the comparator output signal 130 on the communications link 26 is a digital HIGH only when the value of the amplified acceleration output signal 122 in the side control unit 24 exceeds the value of the associated acceleration threshold output signal 128. Therefore, when the transverse vehicle acceleration detected by the side crash sensor 18 exceeds its associated threshold value, as indicated by the acceleration threshold output signal 128, the transverse vehicle acceleration detected by the front crash sensor 30 will not be integrated by the frontal control unit 22 since the velocity determining circuit 81 in the frontal control unit 22 is then disabled by the comparator output signal 130 on the communications link 26.

Figure 4:
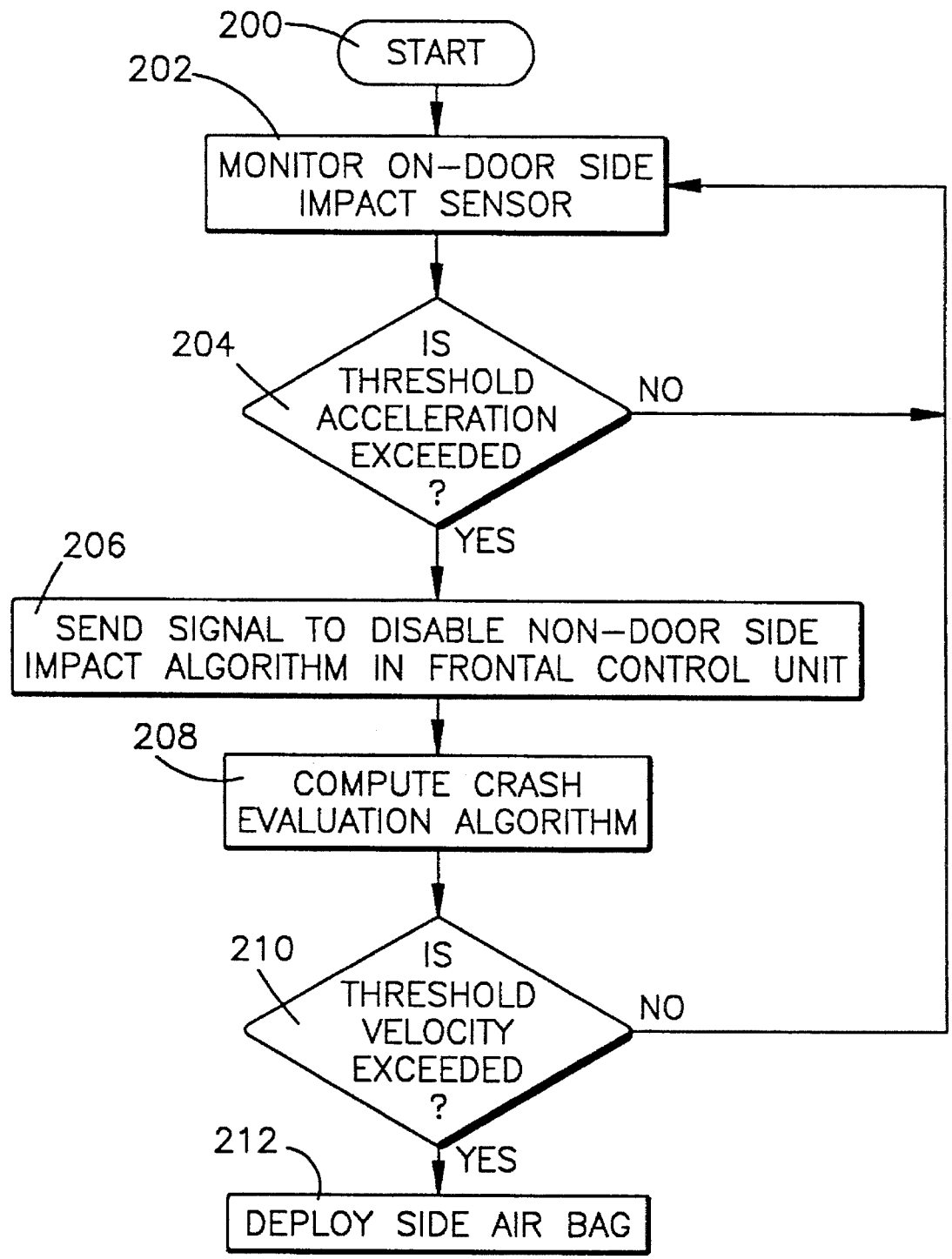
FIGS. 4 and 5 are flow charts showing control processes for controlling the system of FIG. 1 in accordance with the present invention.

The process implemented by the side control unit 24 is shown in the flow chart of FIG. 4. Step 200 starts the process. In step 202, the side control unit 24 monitors the acceleration signal from the side crash sensor 18. That acceleration signal indicates vehicle acceleration transverse to the longitudinal axis of the vehicle. The process proceeds from step 202 to step 204.

In step 204 a determination is made as to whether the value of the acceleration signal from the side crash sensor 18 exceeds a predetermined acceleration threshold value. This predetermined acceleration threshold value represents a minimum value that must be exceeded before the side control unit 24 will further evaluate the acceleration signal from the side crash sensor 18. For example, if a target vehicle is impacted by an impacting vehicle at only 5 mph, the acceleration signal will have a low value that does not exceed the acceleration threshold value, and the side control unit 24 will not further evaluate the acceleration signal provided by the side crash sensor 18. When step 204 thus determines that the acceleration threshold value has not been exceeded, the process goes back to step 202, and step 202 continues to monitor the acceleration signal from the side crash sensor 18.

If step 204 determines that the acceleration threshold value has been exceeded, the process proceeds to step 206. In step 206, the comparator output signal 130 (FIGS. 1, 3A and 3B) is sent from the side control unit 24 to the frontal control unit 22 on the communications link 26. That signal either permits or prevents the frontal control unit 22 from further evaluating the acceleration signal from the front crash sensor 30 beyond a comparison against a predetermined acceleration threshold value. When the acceleration signal from the side crash sensor 18 exceeds its predetermined acceleration threshold value, the signal on the communications link 26 prevents such further evaluation of the acceleration signal from the front crash sensor 30. Step 206 thus ensures that only the side control unit 24 will further evaluate the associated acceleration signal beyond a comparison with an associated acceleration threshold value upon the occurrence of an on-door side impact at the driver's side door.

The process proceeds from step 206 to step 208. In step 208, the acceleration signal provided by the side crash sensor 18 is further evaluated with an associated crash evaluation algorithm. The preferred embodiment of the present invention applies a velocity crash evaluation algorithm to this acceleration signal. The velocity crash evaluation algorithm integrates the acceleration signal, and provides a crash velocity signal indicative of the transverse vehicle velocity resulting from the transverse vehicle acceleration indicated by the acceleration signal.

The process proceeds from step 208 to step 210. In step 210, the value of the crash velocity signal is compared against a predetermined velocity threshold value. The velocity threshold value is determined by examining empirical crash data for the particular vehicle platform. For the particular vehicle platform, the velocity threshold value is a reference value indicative of an on-door side impact requiring deployment of the side air bag 20. If the velocity threshold value is exceeded, the process goes to step 212 and the side air bag 20 is deployed. If the velocity threshold value is not exceeded, the process goes back to step 202.

Figure 5:
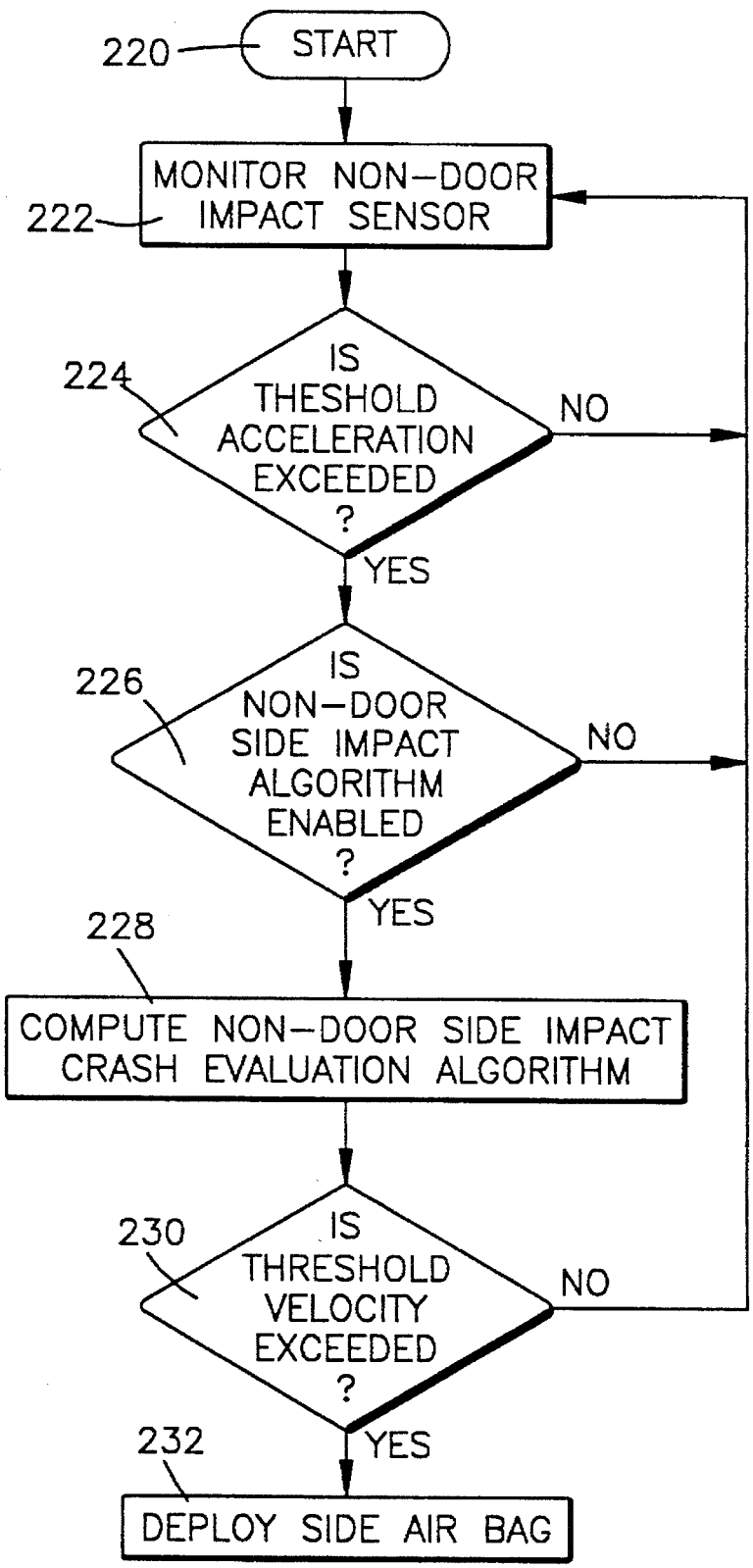

The process implemented by the frontal control unit 22 is shown in the flowchart of FIG. 5. Step 220 starts the process. In step 222, the acceleration signal provided by the front crash sensor 30 is monitored. As described above, the front crash sensor 30 is sensitive to side impacts, and is particularly sensitive to L-shot impacts. The acceleration signal provided by the front crash sensor 30 thus indicates transverse acceleration of the vehicle resulting from such an impact. The process proceeds from step 222 to step 224.

In step 224, a determination is made as to whether the acceleration signal provided by the front crash sensor 30 exceeds a predetermined acceleration threshold value. This acceleration threshold value is preferably lower than that previously discussed with reference to step 204 of FIG. 4. Consequently, the acceleration signal provided by the front crash sensor 30 in the preferred embodiment of the present invention will exceed this acceleration threshold value for transverse vehicle accelerations of smaller magnitudes. If it is determined in step 226 that the acceleration threshold value has not been exceeded, no further evaluation of the acceleration signal from the front crash sensor 30 will be performed, and the process goes back to step 222. If it is determined in step 226 that the acceleration threshold value has been exceeded, the process proceeds to step 226.

In step 226, a determination is made as to whether the acceleration signal from the front crash sensor 30 should be further evaluated. If the side control unit 24 has disabled the frontal control unit 22 via the comparator output signal 130 on the communications link 26 (FIGS. 1, 3A and 3B), the process goes back to step 222. As long as the frontal control unit 22 is disabled by the side control unit 24, no further evaluation of the acceleration signal from the front crash sensor 30 will be performed. If the frontal control unit 22 is not disabled by the side control unit 24, the process proceeds to step 228.

In step 228, the acceleration signal provided by the front crash sensor 30 is further evaluated by an associated crash evaluation algorithm. This crash evaluation algorithm is similar to the velocity crash evaluation algorithm previously described with reference to FIG. 4 and the side control unit 24. The crash evaluation algorithm in step 228 thus integrates the acceleration signal provided by the front crash sensor 30, and generates a crash velocity signal indicative of the transverse vehicle velocity resulting from the transverse vehicle acceleration indicated by the acceleration signal from the front crash sensor 30.

In step 230, the value of the crash velocity signal from step 228 is compared against an empirically predetermined velocity threshold value. If the velocity threshold value is not exceeded by the crash velocity signal, the process goes back to step 222. If the velocity threshold value is exceeded by the crash velocity signal, this is indicative of a side impact to the vehicle, such as an L-shot impact, that requires deployment of the side air bag 20. Accordingly, the process then proceeds to step 232 and the side air bag 20 is deployed.

From the above description of the invention, those skilled in the art will perceive improvements, changes and modifications. For example, although the side air bag 20 described above is mounted on a door, those skilled in the art will appreciate that the present invention is applicable to any side air bag mounting arrangement such as one that mounts the air bag in the door arm rest, vehicle seat, head rail, or other location. The present invention is also applicable to other deployable side impact protection devices, such as inflatable belts, seat belt pretensioners, or any other devices known in the art, whether located at one or both sides of the vehicle or at the front of the vehicle.

Additionally, the preferred embodiment of the present invention integrates acceleration signals to provide crash velocity signals, and compares the crash velocity signals with velocity thresholds to detect deployment crash conditions. However, other algorithms could be used to provide and evaluate crash signals in accordance with the present invention. For example, the present invention could be practiced in part by providing a vibratory electric signal having particular frequency components that may be indicative of a deployment crash condition. Such a signal could be evaluated by indicating the values of those particular frequency components, such as with a filter circuit, and by comparing the indicated values with a threshold value. A method and apparatus for providing and evaluating such a signal is disclosed in U.S. Pat. No. 5,109,341. Alternatively, the present invention could be practiced in part by providing and evaluating a time domain vibratory electric signal as disclosed in U.S. Pat. No. 5,036,467. Still further, the present invention could be practiced in part by providing and evaluating a signal that indicates crash energy as disclosed in U.S. Pat. No. 5,216,607. Such improvements, changes and modifications within the skill of the art are intended to be covered by the appended claims.

Having described the invention, the following is claimed:

1. A method of providing a deployment signal for deploying a vehicle occupant restraint device in response to a side impact to a vehicle, said method comprising the steps of:

sensing a non-door side impact at a non-door location, and providing a non-door side impact signal;

sensing an on-door side impact at a vehicle door, and providing an on-door side impact signal;

evaluating said non-door side impact signal to determine if said non-door side impact signal indicates a non-door deployment crash condition;

evaluating said on-door side impact signal to determine if said on-door side impact signal indicates an on-door deployment crash condition and wherein said step of evaluating said non-door side impact signal is prevented when a value of said on-door side impact signal exceeds an on-door threshold value; and providing a deployment signal for deploying the vehicle occupant restraint device when either of said evaluating steps determines that the respective side impact signal indicates a deployment crash condition.

2. The method defined in claim 1 wherein said step of evaluating said non-door side impact signal determines if a value of said non-door side impact signal exceeds a predetermined non-door threshold value which indicates a deployment crash condition.

3. A method of providing a deployment signal for deploying a vehicle occupant restraint device in response to a side impact to a vehicle, said method comprising the steps of:

sensing a non-door side impact at a location other than a vehicle door, and providing a non-door side impact signal having a value indicative of a characteristic of said non-door side impact;

sensing an on-door side impact at a vehicle door, and providing an on-door side impact signal having a value indicative of a characteristic of said on-door side impact;

evaluating said non-door side impact signal to determine if said value of said non-door side impact signal exceeds a first non-door threshold value;

further evaluating said non-door side impact signal to determine if said value of said non-door side impact signal exceeds a second non-door threshold value;

evaluating said on-door side impact signal to determine if said value of said on-door side impact signal exceeds a first on-door threshold value and wherein said step of further evaluating said non-door side impact signal is prevented when said step of evaluating said on-door side impact signal determines that said value of said on-door side impact signal exceeds said first on-door threshold value;

further evaluating said on-door side impact signal to determine if said value of said on-door side impact signal exceeds a second on-door threshold value; and providing a deployment signal for deploying the vehicle occupant restraint device when either of said values of said side impact signals exceeds its respective second threshold value.

4. The method defined in claim 3 wherein said step of sensing a non-door side impact includes sensing transverse vehicle acceleration caused by said non-door side impact, and said step of providing a non-door side impact signal includes the step of providing a non-door transverse acceleration signal having a value indicating said transverse vehicle acceleration, said first non-door threshold value being a predetermined non-door acceleration threshold value.

5. The method defined in claim 4 wherein said step of further evaluating said non-door side impact signal includes the step of applying an algorithm to said non-door transverse acceleration signal to determine transverse vehicle velocity caused by said non-door side impact, said second non-door threshold value being a predetermined non-door velocity threshold value indicating a deployment crash condition.

6. The method defined in claim 3 wherein said step of sensing an on-door side impact includes sensing transverse vehicle acceleration caused by said on-door side impact, and said step of providing an on-door side impact signal includes the step of providing an on-door transverse acceleration signal having a value indicating said transverse vehicle acceleration, said first on-door threshold value being a predetermined on-door acceleration threshold value.

7. The method defined in claim 6 wherein said step of further evaluating said on-door side impact signal includes the step of applying an algorithm to said on-door transverse acceleration signal to determine transverse vehicle velocity caused by said on-door side impact, said second on-door threshold value being a predetermined on-door velocity threshold value indicating a deployment crash condition.

8. An apparatus for providing a deployment signal for deploying a vehicle occupant restraint device in response to a side impact to a vehicle, said apparatus comprising:

means for sensing a non-door side impact at a non-door location, and for providing a non-door side impact signal;

means for sensing an on-door side impact at a vehicle door, and for providing an on-door side impact signal;

means for evaluating said non-door side impact signal to determine if said non-door side impact signal indicates a non-door deployment crash condition;

means for evaluating said on-door side impact signal to determine if said on-door side impact signal indicates an on-door deployment crash condition;

means for providing a deployment signal for deploying the vehicle occupant restraint device when either of said side impact signals indicates a deployment crash condition; and means for disabling said means for evaluating said non-door side impact signal when a value of said on-door side impact signal exceeds an on-door threshold value.

9. The apparatus defined in claim 8 wherein said means for evaluating said non-door side impact signal determines if a value of said non-door side impact signal exceeds a predetermined non-door threshold value which indicates a deployment crash condition.

10. An apparatus for providing a deployment signal for deploying a vehicle occupant restraint device in response to a side impact to a vehicle, said apparatus comprising:

means for sensing a non-door side impact at a location other than a vehicle door, and for providing a non-door side impact signal having a value indicative of a characteristic of said non-door side impact;

means for sensing an on-door side impact at a vehicle door, and for providing an on-door side impact signal having a value indicative of a characteristic of said on-door side impact;

means for evaluating said non-door side impact signal to determine if said value of said non-door side impact signal exceeds a first non-door threshold value;

means for further evaluating said non-door side impact signal to determine if said value of said non-door side impact signal exceeds a second non-door threshold value;

means for evaluating said on-door side impact signal to determine if said value of said on-door side impact signal exceeds a first on-door threshold value;

means for further evaluating said on-door side impact signal to determine if said value of said on-door side impact signal exceeds a second on-door threshold value;

means for providing a deployment signal for deploying the vehicle occupant restraint device when either of said values of said side impact signals exceed its respective second threshold value; and means for disabling said means for further evaluating said non-door side impact signal when said value of said on-door side impact signal exceeds said first on-door threshold value.

11. The apparatus defined in claim 10 wherein said means for sensing a non-door side impact senses transverse vehicle acceleration caused by said non-door side impact and provides a non-door transverse acceleration signal having a value indicating said transverse vehicle acceleration, said first non-door threshold value being a predetermined non-door acceleration threshold value.

12. The apparatus defined in claim 11 wherein said means for further evaluating said non-door side impact signal applies an algorithm to said non-door transverse acceleration signal to determine transverse vehicle velocity caused by said non-door side impact, said second non-door threshold value being a predetermined non-door velocity threshold value indicating a deployment crash condition.

13. The method defined in claim 10 wherein said means for sensing an on-door side impact senses transverse vehicle acceleration caused by said on-door side impact and said provides an on-door transverse acceleration signal having a value indicating said transverse vehicle acceleration, said first on-door threshold value being a predetermined on-door acceleration threshold value.

14. The method defined in claim 13 wherein said means for further evaluating said on-door side impact signal applies an algorithm to said on-door transverse acceleration signal to determine transverse vehicle velocity caused by said on-door side impact, said second on-door threshold value being a predetermined on-door velocity threshold value indicating a deployment crash condition.

15. A method of providing a deployment signal for deploying a vehicle occupant restraint device in response to a side impact to a vehicle, said method comprising the steps of:

sensing a non-door side impact at a location other than a vehicle door, and providing a non-door side impact signal having a value indicative of a characteristic of said non-door side impact;

sensing an on-door side impact at a vehicle door, and providing an on-door side impact signal having a value indicative of a characteristic of said on-door side impact;

evaluating said non-door side impact signal to determine if said value of said non-door side impact signal exceeds a first non-door threshold value;

further evaluating said non-door side impact signal to determine if said value of said non-door side impact signal exceeds a second non-door threshold value;

evaluating said on-door side impact signal to determine if said value of said on-door side impact signal exceeds a first on-door threshold value;

further evaluating said on-door side impact signal to determine if said value of said on-door side impact signal exceeds a second on-door threshold value; and providing a deployment signal for deploying the vehicle occupant restraint device when either of said values of said side impact signals exceeds its respective second threshold value and wherein said step of providing a deployment signal includes providing a) a first deployment signal for deploying the vehicle occupant restraint device when said value of said non-door side impact signal exceeds said second non-door threshold value, and b) a second deployment signal for deploying the vehicle occupant restraint device when said on-door side impact signal exceeds said second on-door threshold value, said second deployment signal being provided separately from said first deployment signal, and wherein only said second deployment signal is provided when said on-door side impact signal exceeds said second on-door threshold value.

16. An apparatus for providing a deployment signal for deploying a vehicle occupant restraint device in response to a side impact to a vehicle, said apparatus comprising:

means for sensing a non-door side impact at a location other than a vehicle door, and for providing a non-door side impact signal having a value indicative of a characteristic of said non-door side impact;

means for sensing an on-door side impact at a vehicle door, and for providing an on-door side impact signal having a value indicative of a characteristic of said on-door side impact;

means for evaluating said non-door side impact signal to determine if said value of said non-door side impact signal exceeds a first non-door threshold value;

means for further evaluating said non-door side impact signal to determine if said value of said non-door side impact signal exceeds a second non-door threshold value;

means for evaluating said on-door side impact signal to determine if said value of said on-door side impact signal exceeds a first on-door threshold value;

means for further evaluating said on-door side impact signal to determine if said value of said on-door side impact signal exceeds a second on-door threshold value;

means for providing a deployment signal for deploying the vehicle occupant restraint device when either of said values of said side impact signals exceed its respective second threshold value; and wherein said means for providing a deployment signal provides a first deployment signal for deploying the vehicle occupant restraint device when said value of said non-door side impact signal exceeds said second non-door threshold value, and provides a second deployment signal for deploying the vehicle occupant restraint device when said on-door side impact signal exceeds said second on-door threshold value, said second deployment signal being provided separately from said first deployment signal, and wherein said means for providing a deployment signal provides only said second deployment signal when said on-door side impact signal exceeds said second on-door threshold value.

* * * * *

UNITED STATES PATENT AND TRADEMARK OFFICE
CERTIFICATE OF CORRECTION

PATENT NO. : 5,484,166
DATED : January 16, 1996
INVENTOR(S) : Joseph F. Mazur, Brian K. Blackburn and Scott B. Gentry It is certified that error appears in the above-indentified patent and that said Letters Patent is hereby corrected as shown below:

Column 13, line 21, change "method" to --apparatus--.

Column 13, line 28, change "method" to --apparatus--.

Signed and Sealed this

Twentieth Day of August, 1996

Attest:

BRUCE LEHMAN

Attesting Officer

Commissioner of Patents and Trademarks